July 22, 1952    M. A. EDWARDS    2,604,616
EXCITATION SYSTEM
Filed Oct. 28, 1949
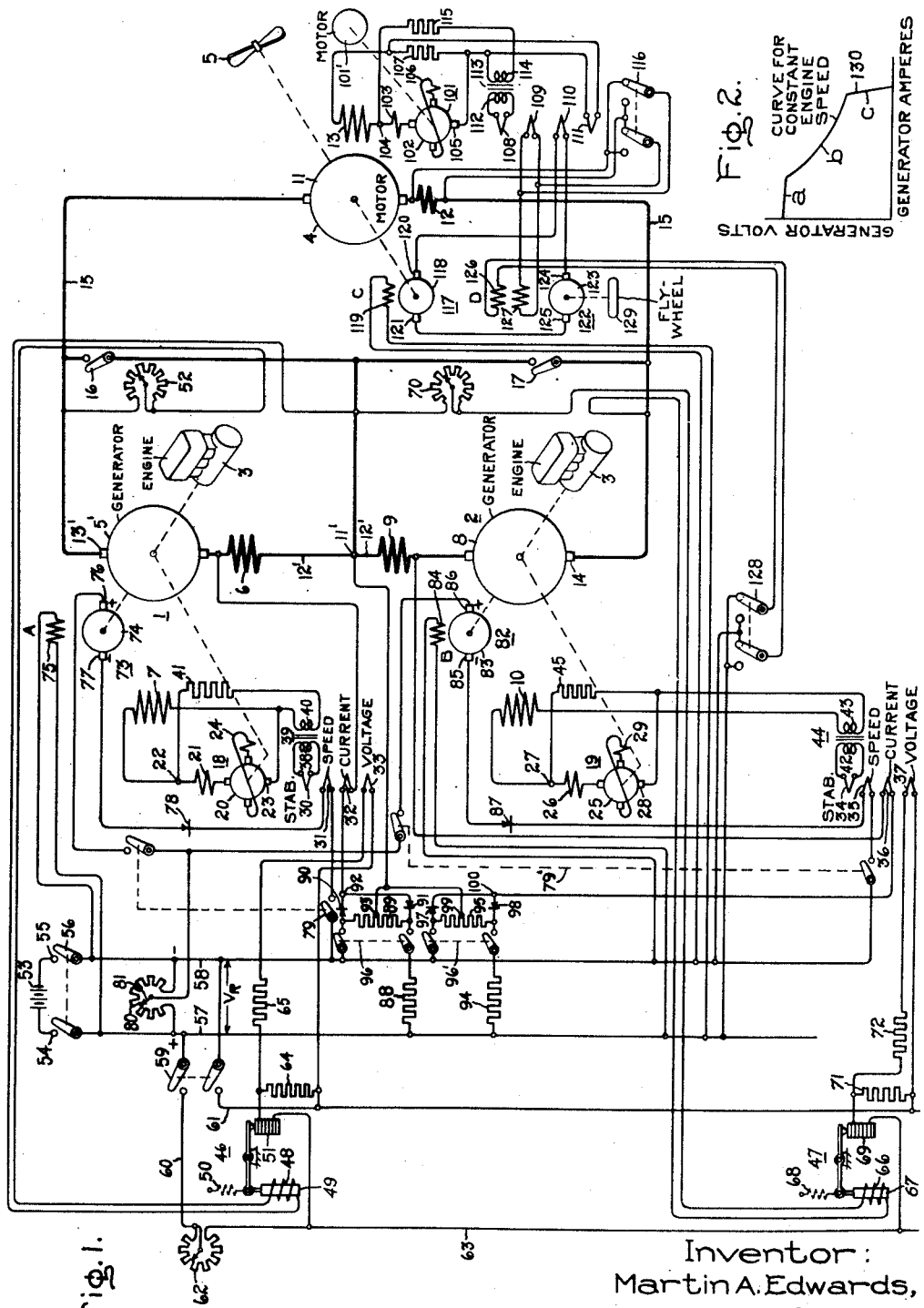
Inventor:
Martin A. Edwards,
by Paul A. Frank
His Attorney.

Patented July 22, 1952

2,604,616

UNITED STATES PATENT OFFICE 2,604,616

EXCITATION SYSTEM

Martin A. Edwards, Scotia, N. Y., assignor to General Electric Company, a corporation of New York Application October 28, 1949, Serial No. 124,213

1 Claim. (Cl. 318—307)

My invention relates generally to power systems for ship drives and the like, wherein an electric generator is driven by a prime mover and arranged to supply current to an electric motor. My invention relates more particularly to excitation systems for the motors in such power systems and to means for providing certain operating arrangements of the generators therein.

In electric drives for ship propulsion use is frequently made of an electric generator arranged to be driven by a suitable prime mover, such as a diesel engine, to supply electrical power to a motor which is arranged to drive the ship's propeller. Various forms of such power systems are well known and in common use. Since a considerable amount of power may be required for high-speed ship propulsion and because engines are limited to certain convenient maximum sizes, it is common practice to employ a number of engine-driven generators, in a single application.

Such units may be electrically connected in a number of ways, but a particularly convenient arrangement is to connect the various generators in series relation to provide a common voltage output to supply current to a main propulsion motor. Under certain conditions, it is desirable that any one or any combination of the generators connected in series relation rather than the entire combination may be employed to supply energy to the propulsion motor. Such occasions arise upon failure of a particular engine or generator or shut-down for repairs or maintenance in which case it is desirable that operation may be maintained on other machines without interruption of service.

In the operation of a propulsion motor for ship drive, it is desirable that the motor be provided with series excitation characteristics and at the same time be readily reversible. While motors of conventional series type may be employed, the switching of relatively heavy power circuits to obtain reversal of the motor is generally inconvenient and requires heavy switching equipment. It is desirable in the construction of modern vessels to minimize the sizes and weights of propulsion apparatus in the interest of increasing vessel speed and load-carrying capacity. It is advantageous, therefore, to employ a motor having a control apparatus of minimum size and weight.

An operating difficulty which has been encountered in the use of series motors for ship propulsion is the danger of loss of load on the motor should the propeller rise out of the water due to motion of the vessel in relatively large waves. Such a loss of load results in a substantial increase in the propeller and motor speeds with considerable accompanying danger of damage to equipment and injury to personnel. It is essential therefore that some means be provided to prevent a sudden increase in motor speed upon loss of propeller load. While speed limiting devices may be employed to impose a definite limit on the propeller speed, it is generally desirable to permit the motor to seek its own speed in accordance with the torque requirements of the propeller but to prevent transient speed changes due to loss of load on the propeller in rough seas.

It is an object of my invention to provide an excitation system for an electric motor whereby a motor of the conventional shunt type is given series excitation characteristics.

It is another object of my invention to provide an apparatus for use with an electric motor having series characteristics to prevent transient changes in the motor speed.

It is a further object of my invention to provide, in a power system employing a number of generators driven by their respective prime movers, an arrangement whereby the generators may be operated singly or in series combination to supply power to a propulsion motor.

In accordance with my invention I provide excitation for a main motor having a shunt field exciting winding through the use of an auxiliary dynamoelectric machine, preferably of the armature reaction excitation type known as an "amplidyne," acting as an exciter. By the use of a current-measuring device to provide excitation for the exciter in proportion to the armature current in the main machine, excitation is likewise provided for the main machine in proportion to the armature current thereof.

To control the transient speed of the main motor I provide an arrangement making use of a second auxiliary dynamoelectric machine, acting as a tachometer generator, driven by the main motor and having a voltage output proportional to the speed thereof. A third auxiliary dynamoelectric machine acting as a motor is supplied with energy by the tachometer generator and has a steady-state speed proportional to the voltage output of the tachometer generator, or the speed of the main propulsion motor and propeller. A relatively large flywheel is driven by the third auxiliary machine and tends to oppose changes in the speed thereof.

Under transient speed conditions excitation provided for the main motor by the exciter is caused to be varied by changes in the voltage output of the tachometer generator. The flywheel-loaded motor provides a counter voltage opposing the tachometer generator voltage output. Under steady-state conditions the counter voltage is nearly equal to the tachometer generator voltage but under transient conditions the difference between the counter voltage, which tends to remain constant due to action of the flywheel, and the tachometer generator voltage may be employed to cause changes in the excitation provided by the exciter for the main propulsion motor to oppose changes in speed thereof.

According to another aspect of my invention an arrangement is provided to permit a generator to be connected in series with other generators or isloated therefrom while in operation without accompanying transient disturbances, by controlling the generator voltage through the use of a voltage regulating device and by the use of a short-circuiting switching arrangement associated with the generator armature.

My invention will be better understood by reference to the following description taken in connection with the accompanying drawing and the appended claim, in which the features of my invention believed to be novel are more particularly set forth.

In the drawing Fig. 1 is a schematic diagram of a power system for a ship drive, embodying certain features of my invention, wherein a pair of electric generators driven by prime movers are arranged to supply power to an electric motor driving a propeller. Fig. 2 is a curve showing certain characteristics of the arrangement of Fig. 1.

Referring now to Fig. 1 there is shown in schematic form a power system particularly suitable for ship propulsion but not limited exclusively thereto. The system shown comprises generally a pair of main generators 1 and 2 driven by a pair of suitable prime movers such as diesel engines 3, and arranged to supply electrical power to a main propulsion motor 4 suitably connected to a propeller 5 of a vessel. Fuel supplied to engines 3 is converted into mechanical energy thereby. Mechanical energy is in turn converted by generators 1 and 2 to electrical energy which is supplied to motor 4 for mechanically driving propeller 5.

The main power connections associated with generators 1 and 2 and motor 4 will first be described. Generator 1 comprises an armature 5', a series commutating winding 6 and a shunt field exciting winding 7. Generator 2 comprises an armature 8, a series commutating winding 9 and a shunt field winding 10. Motor 4 comprises an armature 11, a series commutating winding 12 and a shunt field exciting winding 13. Armature 5' and winding 6 of generator 1 are connected in series relation and armature 8 and winding 9 of generator 2 are similarly connected. Output terminals of generators 1 and 2 may be considered to be the extremities of the series combinations of armature 5' and winding 6 and armature 8 and winding 9 respectively. Generator 1 and 2 are connected in series relation, windings 6 and 9 thereof being joined at a common point 11' by suitable power connections 12'. For convenience the output terminals of the series combination of generators 1 and 2 are given the numerals 13' and 14, terminal 13' being an output terminal of generator 1 and terminal 14 being an output terminal of generator 2.

Armature 11 and winding 12 of motor 4 are connected in series relationship and the input terminals of motor 4 may be considered to be the extremities of the series combination of armature 11 and winding 12. The input terminals of motor 4 are connected by suitable power connections 15 to output terminals 13' and 14 of the series combination of generators 1 and 2. Thus it will be seen that a loop power circuit comprising generators 1 and 2 and motor 4 is effected.

In order to isolate either generator 1 or generator 2 from the series combination thereof, short circuiting switches 16 and 17 are provided across generators 1 and 2. Switches 16 and 17 may be hand-operated switches, such as knife switches, or magnetically-operated switches, as may be desired. Switch 16 is connected between intermediate terminal 11' of generators 1 and 2 and output terminal 13' of generator 1. Switch 17 is similarly connected between terminals 11' and 14.

Attention is next directed to the excitation systems provided for generators 1 and 2. Auxiliary dynamo-electric machines or exciters 18 and 19 are provided to supply excitation for field exciting windings 7 and 10 respectively of generators 1 and 2. Machines 18 and 19, which may conveniently be driven by engines 3 or by separate motors if desired, are preferably of the armature reaction excitation type known as an amplidyne. Exciter 18 has an armature 20 and a compensating field exciting winding 21 connected in series therewith, providing output terminals 22 and 23 at the extremities of the series combination of armature 20 and winding 21. A short circuiting path 24 is provided across intermediate quadrature terminals of armature 20 in accordance with conventional construction of dynamo-electric machines of the amplidye type. Field exciting winding 7 of generator 1 is connected across output terminals 22 and 23 of exciter 18. Exciter 19 is substantially identical to exciter 18 and similarly comprises an armature 25, a compensating winding 26, output terminals 27 and 28 and a short-circuiting path 29. Field exciting winding 10 of generator 2 is connected across terminals 27 and 28.

The excitation for exciter 18 is provided by the use of a plurality of field exciting windings 30, 31, 32 and 33 associated therewith. Similarly, excitation is provided for exciter 19 by a plurality of field exciting windings 34, 35, 36 and 37. Winding 30 is employed as a stabilizing or anti-hunting winding for exciter 18 and is connected to the secondary winding 38 of a stabilizing transformer 39, the primary winding 40 of which is connected across terminals 22 and 23 of exciter 18 through a resistance 41. Winding 34 of exciter 19 is likewise employed for stabilizing and is similarly connected to terminals 27 and 28 through secondary winding 42 and primary winding 43 of a stabilizing transformer 44 and a resistance 45. Windings 31, 32, and 33 of exciter 18 are employed to control respectively the general functions of load, current and voltage associated with generator 1. Windings 35, 36, and 37 are employed to control similar functions associated with generator 2. The excitation system for generators 1 and 2 may best be understood by considering individually these functions and their associated circuits.

Attention is first directed to the voltage control of generators 1 and 2. A pair of conventional voltage regulators 46 and 47 are provided for controlling the voltage outputs of generators 1 and 2 respectively. Regulator 46 comprises a magnetic winding 48, a magnetic armature 49, a biasing spring 50 and a variable resistance carbon pile 51. Winding 48 is connected in series with a variable resistance or rheostat 52 across output terminals 11' and 13 of generator 1, and accordingly is arranged to sense the voltage output of generator 1. Armature 49 is responsive to the magnetic forces provided by winding 48 and is opposed by the biasing force of spring 50. Armature 49 is arranged to vary the degree of compression in carbon pile 51 to change the resistance thereof in response to the current in winding 48 or the voltage impressed thereacross, which in the present case is proportional to the voltage output of generator 1.

A voltage source such as a battery 53, having output terminals 54 and 55, is provided to establish a reference voltage for use in the various excitation control circuits in the power system being described. The reference voltage $V_R$ provided by battery 53 is supplied through a suitable double-pole switch 56 to a pair of buses 57 and 58 to which the various control circuits may conveniently be connected as required.

Voltage $V_R$ is supplied through a double-pole switch 59 to a pair of busses 60 and 61. One terminal of a variable resistance or rheostat 62 is connected to bus 60, and a bus 63 is connected to the other terminal thereof. The voltage appearing between buses 61 and 63 is employed in connection with regulators 46 and 47. Carbon pile 51 is connected in series with a resistance 64 between buses 61 and 63 in a voltage-dividing arrangement. Variations in the resistance of carbon pile 51 cause the voltage appearing across resistance 64 to be varied. Winding 33 of exciter 18 is connected in series with a resistance 65 across the terminals of resistor 64.

Thus variations in the voltage output of generator 1, as impressed on the winding 48 of regulator 46, cause variations in the resistance of carbon pile 51 which in turn causes a variable field exciting current to be supplied to winding 33 from reference voltage $V_R$. In other words, the exciting current in winding 33 is caused to vary in response to variations in the voltage output of generator 1. The elements of regulator 46 are arranged to cause the exciting current in winding 33 to be increased in response to a decrease in the voltage output of generator 1.

Voltage regulator 47 is substantially identical to regulator 46. Regulator 47 accordingly comprises a magnetic winding 66, an armature 67, a biasing spring 68, and a carbon pile 69. Winding 66 is connected in series with a variable resistance or rheostat 70 across the voltage output of generator 2. Carbon pile 69 is connected in series with a resistor 71 across buses 61 and 63, and winding 37 of exciter 19 is connected in series with a resistor 72 across the terminals of resistor 71. The elements of regulator 47 are arranged, as in the case of regulator 46, to cause variations in the exciting current in winding 37 in response to variations in the voltage output of generator 2.

Attention is next directed to the load control circuits associated with exciters 18 and 19. An auxiliary dynamoelectric machine 73 acting as a tachometer generator is arranged to be mechanically driven by generator 1 at a speed proportional to the speed of generator 1 and the engine 3 associated therewith. Tachometer 73 is preferably a direct-current machine having an armature 74 and a field exciting winding 75. Winding 75 is connected to reference voltage $V_R$ and accordingly provides substantially constant field excitation for tachometer generator 73. Armature 74 is provided with output terminals 76 and 77 across which appears the voltage output of tachometer 73.

Output terminal 77 is connected to one terminal of a unidirectional conducting device 78, preferably a dry-plate rectifier of the selenium type. The other terminal of device 78 is connected to one terminal of winding 31 of exciter 18. The other terminal of winding 31 is connected to one pole of a double-pole switch 79. Output terminal 76 of tachometer 73 is connected to the other pole of switch 79. The end terminals of a rheostat 80 are connected across reference voltage $V_R$. The voltage between the variable tap 81 of rheostat 80 and bus 58 serves as a biasing voltage particularly for use with the speed control circuits being described. The first-mentioned pole of switch 79 leading from winding 31 is connected directly to bus 58 and the second-mentioned pole of switch 79 is connected to variable tap 81 of rheostat 80. Thus a loop circuit is established including armature 74 of tachometer 73, one pole of switch 79, the bias voltage between tap 81 and bus 58, the other pole of switch 79, winding 31 and unidirectional conducting device 78.

The load control circuit for exciter 19 is generally similar to the circuit described in connection with exciter 18. A tachometer generator 82 is driven at a speed proportional to the speeds of generator 2 and the engine 3 associated therewith. Tachometer 82 has an armature 83 and a field exciting winding 84, the latter being supplied from reference voltage $V_R$ to provide substantially constant field excitation for tachometer 82. Armature 83 has output terminals 85 and 86. Terminal 85 is connected to one terminal of a unidirectional conducting device 87 similar to device 88. The other terminal of device 87 is connected to one terminal of winding 35, the other terminal whereof is connected through one pole of a double-pole switch 79' to bus 58. Terminal 86 of armature 83 is connected through the other pole of switch 79' to variable tap 81 of rheostat 80. Thus a loop circuit is established including armature 83, one pole of switch 79', the bias voltage between tap 81 and bus 58, the other pole of switch 79', winding 35 and device 87.

Attention is next directed to the current control circuits associated with exciters 18 and 19. The general function of these circuits is to modify the excitation provided by exciter 18 in response to variations in the current in generators 1 and 2. In the case of generator 1 an indication of this current is obtained by sensing the voltage drop across commutating winding 6 of generator 1. To provide a reference voltage a pair of resistances 88 and 89 are connected in series across voltage $V_R$ in a voltage-dividing arrangement. A double-pole switch 96 is connected in series with the connections of resistor 89 to permit isolation thereof from resistor 88 and voltage $V_R$. One terminal of resistance 88 is connected to bus 57 and the other terminal thereof is connected to one pole of switch 96, this pole also being connected to one terminal of resistance 89. The other terminal of resistance 89 is connected in series with the other pole of switch 96' to bus 58.

A pair of unidirectional conducting devices 90 and 91, preferably selenium rectifiers, are connected in series, poled in the same direction, across resistance 89. One end of winding 32 is connected to the junction point of winding 6 and armature 5 and the other end of winding 32 is connected to the junction point 92 between rectifiers 90 and 91. An intermediate point 93 of resistance 89, which may be the center point thereof, is connected to terminal 11' between generators 1 and 2. Thus the voltage drop of winding 6 is compared with a fixed bias voltage and the difference of these voltages is caused to modify the excitation of exciter 18 through winding 32.

The current control circuit for exciter 19 is generally similar to the circuit associated with exciter 18 and accordingly includes a pair of resistors 94 and 95, a double-pole switch 96', a pair of selenium rectifiers 97 and 98 and winding 36. As in the case of the current control circuit associated with exciter 18, the voltage drop across winding 9 which is indicative of the current in generator 2 is compared with a fixed bias voltage provided between intermediate point 99 of resistor 95 and point 100 between rectifiers 97 and 98.

The difference between these voltages is caused to modify the excitation of exciter 19 through winding 36.

Attention is next directed to the excitation system for motor 4. An auxiliary dynamoelectric machine 101 acting as an exciter is provided to supply excitation to field exciting winding 13 of motor 4, and is arranged to be driven at a constant speed by a motor 101' which may be provided with power by an auxiliary source (not shown). Exciter 101, which is preferably of the armature reaction excitation type known as an amplidyne, has an armature 102 and a field exciting winding 103 connected in series therewith, providing output terminals 104 and 105 at the extremities of the series combination of armature 102 and winding 103. A short-circuiting path 106 is provided across intermediate quadrature terminals of armature 102 in accordance with conventional construction of dynamoelectric machines of the amplidyne type. One terminal of winding 13 is connected to output terminal 104 and the other terminal of winding 13 is connected in series with a resistance 107 to output terminal 105.

Excitation is provided for exciter 101 by the use of a plurality of field exciting windings 108, 109, 110 and 111 associated therewith. Winding 108 is employed as a stabilizing or anti-hunting winding for exciter 101 and is connected to the secondary winding 112 of a stabilizing transformer 113, the primary winding 114 of which is connected across terminals 104 and 105 of exciter 101 through a resistance 115.

The principal portion of the excitation for exciter 101 is derived by sensing the current in armature 11 of motor 4 to provide an excitation in shunt field exciting winding 13 thereof substantially proportional to the armature current, thereby giving motor 4 series excitation characteristics. Winding 109 of exciter 101 is connected through a suitable double-pole reversing switch 116 to the terminals of commutating winding 12 of motor 4. Current flowing through winding 12 provides a voltage drop thereacross which is impressed on winding 109, the polarity of the impressed voltage being determined by the position of switch 116. Winding 111 is connected across the terminals of resistance 107 to provide excitation opposing the excitation in winding 109, as will be hereinafter explained.

Winding 110 is employed in the transient speed control circuit of exciter 101 for motor 4. A dynamoelectric machine 117 acting as a tachometer generator is arranged to be driven at a speed proportional to the speed of motor 4. Machine 117 is preferably of the direct current type having an armature 118 and a shunt field exciting winding 119. Winding 119 is connected across reference voltage $V_R$ and accordingly provides substantially constant field excitation for generator 117. Armature 118 has output terminals 120 and 121 across which appears the voltage output of tachometer 117 which is proportional to the speed of motor 4.

A second auxiliary dynamoelectric machine 122 acting as a motor is arranged to be driven by the voltage output of tachometer 117. Machine 122 is preferably of the direct current type having an armature 123 and input terminals 124 and 125. A loop circuit is established including tachometer 117, motor 122 and winding 110. Output terminal 121 of tachometer generator 117 is connected to input terminal 125 of motor 122. Input terminal 124 is connected to one terminal of winding 110, the other terminal thereof being connected to output terminal 120 of tachometer 117. A relatively large fly-wheel 129 is arranged to be driven by motor 122 at a speed proportional to the speed thereof. The function of fly-wheel 129 is to resist transient speed changes in motor 122 tending to take place in response to variations in the voltage impressed on armature 123 thereof.

Machine 122 is provided with a pair of field exciting windings 126 and 127. Winding 126 is connected across reference voltage $V_R$ through a suitable reversing switch 128. Thus a substantially constant excitation is provided in winding 126 for motor 122, the polarity of the excitation being determined by the position of reversing switch 128. Winding 127 is arranged to be excited in proportion to the current in the armature of motor 4 and accordingly winding 127 is connected in parallel relation with winding 109 of exciter 101. The polarity of the excitation provided in winding 127 is dependent, as in the case of winding 109, upon the position of reversing switch 116.

Attention is next directed to the operation of the above-described power system with particular attention to the features of my invention included therein. In considering the operation of the system it is assumed that engines 3 are arranged for substantially constant-speed operation and that the operating speeds thereof are maintained by suitable governing devices (not shown) associated with engines 3. While the operating speeds of engine 3 are assumed to be substantially constant, the speeds may if desired, be adjustable through variable settings of the governing devices, in accordance with well-known principles, to suit vessel propulsion power requirements.

There are three general functions of the complete excitation systems for generators 1 and 2. The first is to establish relatively constant voltage outputs in generators 1 and 2 at relatively light loads, the limitation in this case being the voltage outputs for which generators 1 and 2 are designed. The second function is to reduce the excitation and voltage outputs of generators 1 and 2 to maintain substantially constant power outputs therefrom so that the loads taken from engines 3 are consistent with the power capabilities thereof for the particular speeds at which they are operating. The third function is to reduce further the excitations and voltage outputs of generators 1 and 2 in response to excessive currents therein which may impose severe commutating duty thereon.

While engine-driven generators 1 and 2 are arranged to be operated singly or in series to provide power for motor 4 to drive propeller 5, the operation may best be understood by considering first the operation of a single generator and its associated excitation system and accordingly the description will first be directed to generator 1. Under the condition of operating generator 1 singly, generator 2 may be rendered inoperative by closing switch 17 across the output terminals thereof, thereby completely by-passing generator 2. The path of current flow from generator 1 is then from terminal 11' through switch 17, winding 12 and armature 11 of motor 4, to output terminal 13' of generator 1.

Control of the excitation for generator 1 in response to the three functions of voltage, power and current is accomplished through the medium of exciter 18 by action of the various control circuits described above. The voltage output of generator 1 at no load and at relatively light loads is maintained by action of voltage regulator 46.

Reference voltage $V_R$ is impressed on buses 57 and 58 and is supplied to regulator 46 by first closing switch 56 and subsequently closing switch 59. A field exciting current is thus made to flow in winding 33 of exciter 18. The regulated voltage maintained across output terminals 11' and 13' of generator 1 is sensed by winding 48 which varies the magnitude of force in armature 49 against biasing spring 50 to vary correspondingly the resistance of carbon pile 51. Regulator 46 is arranged to require a constant current in winding 48 for steady-state conditions. Variation in the resistance in series with winding 48 causes variation in the voltage output of generator 1 required to maintain a constant current in winding 48. Thus the regulated voltage maintained by regulator 46 may be adjusted by the use of rheostat 52.

The action of regulator 46 is such that the voltage output of generator 1 tends to be maintained at the set value without regard to the load current demand on generator 1, within the power delivering capabilities thereof. Thus if the load current in generator 1 is increased to a relatively large value the voltage output of generator 1 is eventually reduced, as is well known, by the inherent regulation therein, but an attempt is made by regulator 46 to increase the excitation to maintain the voltage output of generator 1 at the set value.

Under such conditions the power taken from generator 1, as given approximately by the product of generator voltage output and current output, may exceed the safe power capabilities of engine 3. Since engine 3 is assumed to be operating at a constant speed, substantially constant torque and power is available therefrom. However, generally the power-delivering capability of a generator when driven by an engine tends to exceed, at certain combinations of voltage and current, the safe value of engine power output. It is desirable, therefore, to limit the electrical power load which may be taken from an engine-driven generator to the power capabilities of the driving engine.

A convenient method of providing such a limitation is to make use of the speed characteristic of the engine under overload conditions. It is well known that an engine tends to slow down if overloaded since the throttle may be advanced only to its maximum setting by the governor. If a reduction in speed is measured and such a reduction is employed to reduce the excitation provided for a loading generator so that unloading of the generator if effected to maintain the engine speed at substantially the set value, then protection will be provided for the engine.

In the arrangement of Fig. 1 the so-called load control circuit previously described is employed for this purpose. In particular, tachometer 73 is driven at a speed proportional to the speed of engine 3 and, being provided with constant excitation, has a voltage output proportional to the speed of generator 1 and engine 3. To make the speed circuit of tachometer 73 effective switch 79 is closed, while switch 79' is opened to isolate the speed circuit associated with generator 2.

The reduction in excitation of exciter 18 as a function of the speed of engine 3 is obtained in the following manner. A substantially constant biasing voltage, obtained from reference voltage $V_R$ by a suitable setting of tap 81 of rheostat 80, is connected in series with the voltage output of tachometer 73, unidirectional conducting device 78, and winding 31. The polarities of the circuit voltages are as indicated in Fig. 1, output terminal 76 of tachometer 73 and bus 58 being plus. In other words, the voltages mentioned are connected in opposition in series with unidirectional conducting device 78.

Device 78 is so poled in the circuit that the biasing voltage tends to circulate a current through winding 31. However the voltage output of tachometer 73 is arranged to be slightly greater than the biasing voltage under normal conditions and therefore when engine 3 is running at the set speed substantially no current flows in speed winding 31. Should the voltage output of tachometer 73 increase above the normal value due to an increase in engine speed, current is prevented from flowing in winding 31 by unidirectional conducting device 78. However, should engine 3 and tachometer 73 slow down due to overload conditions in engine 3, a current flows in winding 31 providing excitation tending to oppose the excitation provided by winding 33 to reduce the net excitation and voltage output of exciter 18. Thus the excitation provided for generator 1 in winding 7 is reduced causing a corresponding reduction in the voltage output of generator 1 and the load taken therefrom.

It will be seen that a regulating action takes place through the load circuit associated with winding 31 tending to maintain the excitation and voltage output of generator 1 at a value which permits operation of engine 3 at the set value without danger of overload. This range of operation is indicated by portion "b" of curve 130 in Fig. 2, portion "a" indicating the initial voltage control range described above.

As the load current taken from generator 1 is increased, it is desirable to limit the current which may be taken therefrom to a value consistent with the commutating ability of generator 1. The magnitude of the current taken from generator 1 is sensed for control purposes by measuring the voltage drop across commutating winding 6 of generator 1. This voltage is compared with a fixed bias voltage provided by the use of resistor 89 and unidirectional conductors 90 and 91, the difference between the measured voltage drop and fixed bias being impressed on current-limiting field 32 of exciter 18.

It will be understood that the current-limiting circuit shown, due to the unidirectional conducting properties of devices 90 and 91, is effective in providing current-limiting action for flow of current in either direction through generator 1 and winding 6. Thus in case generator 1 and engine 3 tend to be driven by motor 4 acting as a generator, causing reverse current to flow in generator 1, the current-limiting circuit is effective in limiting such current. It may be desirable to limit the reverse current to a smaller value than the normal forward current, in which case intermediate point 93 may not be located at the center of resistor 89 but may be displaced from the center thereof to provide greater fixed bias voltage in the forward than in the reverse direction. Thus the current-limiting circuit is arranged to reduce the excitation provided for generator 1 by exciter 18 in response to values of current above predetermined values in either direction through generator 1. Below these predetermined values the current-limiting circuit is substantially inoperative. The range of operation of the current-limiting circuit is indicated by portion "c" of curve 130 in Fig. 2.

Attention is now directed to the operation of the excitation circuit associated with motor 4. As previously mentioned, a particular function of the excitation circuit for motor 4, which is a shunt machine, is to provide series excitation characteristics therefor through exciter 101 which provides exciting current for shunt field exciting winding 13 of motor 4. To obtain excitation of winding 13 in proportion to the load current taken by motor 4 excitation is provided for exciter 101 in proportion to the load current of motor 4.

The load current of motor 4 is sensed by measuring the voltage drop across commutating winding 12 thereof, the drop being impressed on winding 109 of exciter 101. Thus, considering first only winding 109 and the current-responsive drop impressed thereon, the voltage output of exciter 101 tends to be proportional to the load current of motor 4, and since this voltage is impressed on winding 13 the exciting current therein likewise is proportional to the load current of motor 4.

To increase the sensitivity and accuracy of the voltage output of exciter 101 to the current in motor 4, the voltage drop across resistor 107, which is proportional to the current in winding 13 and exciter 101 is impressed on winding 111 which is arranged to provide excitation for exciter 101 in opposition to the excitation provided by winding 109.

Actually the strength or effectiveness of winding 109 is preferably made several times greater than is necessary to provide excitation for exciter 101. The excess of strength of winding 111 is likewise preferably made several times stronger than is necessary. While the respective strength of windings 109 and 111 are both made relatively larger than necessary, the strength of winding 111 is made slightly less than the strength of winding 109 so that the net excitation for exciter 101 is always provided winding 109.

The advantage in an arrangement wherein a relatively large component of excitation is effectively counter-balanced by a second relatively large component of excitation, is the increased accuracy and sensitivity obtainable in causing the current output of exciter 101 to follow exactly the load current in motor 4. By the use of the arrangement shown, a regulating effect is obtained which provides a higher degree of accuracy in the use of exciter 101 than would otherwise be obtainable. By the use of reversing switch 116 the direction of exciting current in winding 109 and consequently the polarity of the voltage output of exciter 101 and the field exciting current in winding 13 may conveniently be reversed to effect reversal of rotation of motor 4. As the current in winding 13 and resistor 107 is reversed, the excitation provided by winding 111 is likewise reversed so that the relationship between windings 109 and 111 remains unchanged.

The excitation system for motor 4 as thus far described provides, for operation under steady-state or gradually changing load conditions in motor 4, an exciting current in field exciting winding 13 which is at all times substantially proportional to the load current of motor 4. Therefore motor 4, although of shunt construction, is provided with series excitation characteristics.

Attention is now directed to the transient speed control circuit associated with the excitation system for motor 4. In particular tachometer generator 117 which is provided with a substantially constant field excitation has a voltage output proportional to the speed of motor 4. The voltage output of tachometer 117 is impressed on the series combination of armature 123 of motor 122 and winding 110 of exciter 101. Winding 110 preferably has relatively low resistance and accordingly the greater part of the voltage of tachometer 117 appears across armature 123. A substantially constant component of excitation is provided for motor 122 by field exciting winding 126.

Considering first only armature 123 and winding 126, motor 122 assumes, for steady-state speed conditions in motor 4, a constant steady-state speed. Flywheel 129 being coupled to motor 122 is driven at the speed thereof. Since under steady-state conditions the load imposed on motor 122 by flywheel 129 is relatively small only a relatively small current, due to the losses in motor 122, flows in winding 110. In other words winding 110 and the transient speed circuit associated therewith has little effect on the excitation of exciter 101 under steady-state conditions in motor 4.

However, should motor 4 suddenly accelerate due, for example, to propeller 5 coming out of the water in rough seas, tachometer 117 is likewise accelerated with an accompanying sudden increase in the voltage output thereof. Since acceleration of motor 122 is opposed by flywheel 129 the speed of motor 122 tends to remain constant and accelerates only very slowly even though the voltage impressed across armature 123 is suddenly increased. Since the counter-voltage provided by armature 123 tends temporarily to remain at its former value an increase in current flows in the circuit of tachometer 117, armature 123 and winding 110.

Winding 110 is arranged so that the transient current flowing therein causes an increase in the excitation of exciter 101 and likewise an increase in the field exciting current in winding 13 of motor 4. It will thus be seen that a sudden increase in the speed of motor 4 due to unloading thereof is followed by a corresponding increase in the excitation therefor which tends to prevent overspeeding of motor 4.

While motor 122 is provided with a constant component of excitation by winding 126, the above-described action of motor 122 is modified by the use of field exciting winding 127 to vary the excitation for motor 122 in response to changes in the current of motor 4. As previously noted, winding 127 is connected in parallel relation with winding 109 of exciter 101 and accordingly is provided with an exciting current proportional to the voltage drop across winding 12 and hence the load current in motor 4.

Windings 126 and 127 are so arranged that under normal conditions the excitation provided by winding 127 is in the same direction as, or aids, the excitation provided by winding 126. Under conditions of reverse operation of motor 4 the current in winding 127 is reversed by action of switch 116, while the current in winding 126 is simultaneously reversed by action of switch 128. The relationship of the components of excitation provided by windings 126 and 127 thus remains unchanged.

One function of winding 127 is to shift or "recalibrate" the steady-state speed of motor 122 in response to relatively gradual changes in the load current in motor 4. For relatively high currents the net excitation of motor 122 is also relatively high causing the speed thereof to be relatively low. A sudden increase in the speed of motor 4 due to unloading is generally accompanied by a corresponding sudden decrease in load current. Such a decrease results in a weakening of the excitation of motor 122, so that the counter voltage thereof, which is connected in opposition to the voltage output of tachometer 117, is less than would otherwise be the case, due to the combination of relatively low motor speed and weak field. Therefore the difference of these voltages, which is employed to provide a current in winding 110 to oppose transient speed changes in motor 4, is increased in effectiveness.

The operation of the excitation systems associated with generators 1 and 2 has thus far been described in terms of a single engine-generator unit only. It will be understood, however, that the operation of the excitation system associated with motor 4, as described, takes place without regard to the number of generators supplying power to connections 15, and therefore the following description of operation of generators 1 and 2 in series combination is given without regard to motor 4 and the excitation system associated therewith.

To place generators 1 and 2 in series relation, switches 16 and 17 are both opened permitting load current to be supplied to connections 15 by both generators 1 and 2. Switches 56 and 59 are closed to provide energization for voltage regulators 46 and 47. Switches 79 and 79' and switches 96 and 96' are likewise closed to render the various load and current control circuits operative.

Once series connections are established between generators 1 and 2 and the various control circuits are made operative, the voltage outputs of generators 1 and 2 are maintained by regulators 46 and 47 respectively and are independently adjustable through rheostats 52 and 70. The load and current control circuits function in the manner previously described for single unit operation.

A particular feature of my invention is the manner in which individual generators may be placed in or taken out of service without disturbing other machines operating in series to supply power to a load. If it is assumed that generators 1 and 2 are operating in series relation as described above, then generator 1, for example, may be removed from service in the following manner. The voltage output of generator 1 is first reduced to a relatively low value by decreasing the net resistance setting of rheostat 52, thereby causing a lower voltage to be maintained by regulator 46. When the voltage output of generator 1 is reduced to a relatively low value, switch 16 may be closed to short-circuit or bypass generator 1. Current which tends to be circulated through switch 16 by the reduced voltage of generator 1 is limited to a safe value by the current-limiting circuit associated therewith.

Switches 79 and 96 may be opened to isolate the load and current control circuits of generator 1 from the respective circuits of generator 2. Following the short-circuiting of generator 1, engine 3 associated therewith may be shut down, thereby rendering generator 1 completely inoperative. It will be understood that by a reversal of the procedure described above generator 1 may be again placed in service without affecting other machines. It will be obvious that any convenient number of machines may be operated in series and that the procedures described may be employed to place the machines in service or remove them therefrom.

By constructing a power system in accordance with my invention, I wish to point out that a high degree of flexibility of control may be achieved. In the case of engine-driven generators it is highly desirable that individual machines may readily be removed from service for maintenance, and that standby machines may be placed in service without interruption of system operation to insure reliability of service. By the voltage control and by-passing arrangement of my invention, these functions may readily be accomplished.

In the case of the driving motor which is supplied with power by one or more engine-driven generators, a particularly flexible control arrangement is provided by the use of a shunt machine and an exciter to provide excitation therefor. In particular the motor is provided with series excitation characteristics, which is highly desirable in many transportation applications, and at the same time certain desirable control characteristics of shunt motors, such as simplicity of reversing, switching, and power connections, are provided.

In addition, by the use of an exciter, preferably of the amplidyne type, other control functions may readily be employed to control motor operation. A particular feature of my invention in this regard is the transient speed control circuit, as embodied in a tachometer generator and motor-driven flywheel, which reduces to a minimum transient increases in motor speed due to transient unloading thereof, yet permits the motor to seek its own steady-state speed in accordance with power requirements of the driven load. Such an arrangement provides an operator with ample time to adjust the motor control circuits under emergency conditions should sustained unloading of the motor occur.

While I have shown and described a preferred embodiment of my invention together with a particular system of connections, it will be understood that my invention may well take other forms and I, therefore, aim in the appended claim to cover all such changes and modifications as fall within the true spirit and scope of my invention.

What I claim as new and desire to secure by Letters Patent of the United States is:

An excitation system for a main dynamoelectric machine connected to a load including a field exciting winding, an auxiliary dynamoelectric machine arranged to energize said field exciting winding, a second auxiliary dynamoelectric machine associated with said first-mentioned dynamoelectric machine and having a voltage output responsive to the speed thereof, a third auxiliary dynamoelectric machine arranged to be supplied with energy by said second-mentioned auxiliary dynamoelectric machine and to have a steady-state speed responsive to the voltage output thereof, flywheel means associated with said third-mentioned auxiliary dynamoelectric machine and arranged to resist transient variations in the speed thereof, a field exciting winding associated with said first-mentioned auxiliary dynamoelectric machine and arranged to be energized by the current in said third-mentioned auxiliary dynamoelectric machine to control the energization for said first-mentioned field exciting winding to tend to maintain the speed of said main dynamoelectric machine constant with transient variations in load thereon.

MARTIN A. EDWARDS.

REFERENCES CITED

The following references are of record in the file of this patent:

UNITED STATES PATENTS

| Number | Name | Date |
|---|---|---|
| 1,276,827 | Tanner | Aug. 27, 1918 |
| 1,290,908 | Carothers | Jan. 14, 1919 |
| 1,584,608 | Butler | May 11, 1926 |
| 2,305,937 | Montgomery et al. | Dec. 22, 1942 |
| 2,308,994 | Mickey | Jan. 19, 1943 |